United States Patent [19]
Yanagi et al.

[11] Patent Number: 5,673,243
[45] Date of Patent: Sep. 30, 1997

[54] ENCODING UNIT AND STORAGE UNIT USING THE SAME

[75] Inventors: Shigenori Yanagi, Kawasaki; Satoshi Furuta, Kato-gun, both of Japan

[73] Assignee: Fujitsu Limited, Kawasaki, Japan

[21] Appl. No.: 584,795

[22] Filed: Jan. 11, 1996

[30] Foreign Application Priority Data

Mar. 31, 1995 [JP] Japan ................................. 7-076760

[51] Int. Cl.⁶ .................................................. G11B 7/00
[52] U.S. Cl. ...................... 369/59; 369/50; 369/48; 360/48; 360/51
[58] Field of Search ..................... 369/59, 58, 54, 369/53, 47, 48, 49, 50, 32, 124; 360/48, 51, 39, 53, 29, 30, 32

[56] References Cited

U.S. PATENT DOCUMENTS 4,275,466  6/1981  Yamamoto ................. 360/51 X

FOREIGN PATENT DOCUMENTS 1319178  12/1989  Japan .
644562   2/1994   Japan .
6139708  5/1994   Japan .
6195893  7/1994   Japan .

OTHER PUBLICATIONS

"Data Interchange on 90 mm Optical Disk Cartridges", ISO/IEC JTC 1/SC 3 N 705, 1.23.06 Draft 2 Dec. 1994.

*Primary Examiner*—Muhammad N. Edun
*Attorney, Agent, or Firm*—Greer, Burns & Crain, Ltd.

[57] ABSTRACT

An encoding unit encodes data to be recorded on a recording medium. The encoding unit includes a first part for inserting resynchronizing bytes between two data blocks within a data field when converting data coded by a predetermined modulation code which generates patterns having D.C. components into pulse width modulation data, where the resynchronizing bytes have resynchronizing patterns and achieve synchronization when a clock slip occurs within the data field, a second part for calculating a digital sum value for a predetermined data block, where the digital sum value indicates a difference between a sum total of logic values "1" and a sum total of logic values "0" in the pulse width modulation data, and a third part for controlling the first part so that the resynchronizing bytes having resynchronizing patterns that minimize the digital sum value is inserted in a present data block.

26 Claims, 12 Drawing Sheets

FIG. 1A

| SM | VF01 | AM | ID1 | VF02 | AM | ID2 | PA |
|---|---|---|---|---|---|---|---|
| 8 | 26 | 1 | 5 | 16 | 1 | 5 | 1 |

FIG. 1B

| PFH | G | RF | | | | B |
| | | VF03 | S | DF | PA | |
|---|---|---|---|---|---|---|
| 63 | 8 | 27 | 4 | 658 | 1 | 17 |

FIG. 1C

| PFH | G | RF | | | | B |
| | | VF03 | S | DF | PA | |
|---|---|---|---|---|---|---|
| 63 | 8 | 27 | 4 | 2458 | 1 | 23 |

FIG. 2

| PRECEDING CHANNEL BIT | PRESENT INPUT BITS | SUBSEQUENT INPUT BITS | CHANNEL BITS RLL(1,7) MODULATION CODE |
|---|---|---|---|
| X | 0 0 | 0 X | 0 0 1 |
| 0 | 0 0 | 1 X | 0 0 0 |
| 1 | 0 0 | 1 X | 0 1 0 |
| 0 | 0 1 | 0 X | 0 0 1 |
| 0 | 0 1 | 1 X | 0 0 0 |
| 1 | 0 1 | 0 0 | 0 1 0 |
| 1 | 0 1 | not 0 0 | 0 0 0 |
| 0 | 1 0 | 0 X | 1 0 1 |
| 0 | 1 0 | 1 X | 0 1 0 |
| 0 | 1 1 | 0 0 | 0 1 0 |
| 0 | 1 1 | not 0 0 | 1 0 0 |

FIG. 3

| COLUMN NUMBER j | | | | 0 | 1 | 2 | 3 | 4 | ROW NUMBER i |
|---|---|---|---|---|---|---|---|---|---|
| SB1 | SB2 | SB3 | SB4 | D1 | D2 | D3 | D4 | D5 | 103 |
| | | | | D6 | D7 | D8 | D9 | D10 | 102 |
| | | | | D11 | D12 | D13 | D14 | D15 | 101 |
| | | | | D16 | D17 | D18 | D19 | D20 | 100 |
| RS1 | RS1 | | | D21 | D22 | D23 | D24 | D25 | 99 |
| | | | | D26 | D27 | D28 | D29 | D30 | 98 |
| | | | | D31 | D32 | D33 | D34 | D35 | 97 |
| RS25 | RS25 | | | D501 | D502 | D503 | D504 | D505 | 3 |
| | | | | D506 | D507 | D508 | D509 | D510 | 2 |
| | | | | D511 | D512 | (FF) | (FF) | (FF) | 1 |
| | | | | (FF) | C1 | C2 | C3 | C4 | 0 |
| RS26 | RS26 | | | E1.1 | E2.1 | E3.1 | E4.1 | E5.1 | −1 |
| | | | | E1.2 | E2.2 | E3.2 | E4.2 | E5.2 | −2 |
| | | | | E1.3 | E2.3 | E3.3 | E4.3 | E5.3 | −3 |
| RS29 | RS29 | | | E1.13 | E2.13 | E3.13 | E4.13 | E5.13 | −13 |
| | | | | E1.14 | E2.14 | E3.14 | E4.14 | E5.14 | −14 |
| | | | | E1.15 | E2.15 | E3.15 | E4.15 | E5.15 | −15 |
| | | | | E1.16 | E2.16 | E3.16 | E4.16 | E5.16 | −16 |

104 ROWS

16 ROWS

FIG. 4

| FIG. 4A | FIG. 4B |
|---|---|

FIG. 4B

| | 9 | 10 | 11 | 12 | 13 | 14 | 15 | 16 | 17 | 18 | 19 | ROW NUMBER j |
|---|---|---|---|---|---|---|---|---|---|---|---|---|
| | D10 | D11 | D12 | D13 | D14 | D15 | D16 | D17 | D18 | D19 | D20 | 102 |
| | D30 | D31 | D32 | D33 | D34 | D35 | D36 | D37 | D38 | D39 | D40 | 101 |
| | D50 | D51 | D52 | D53 | D54 | D55 | D56 | D57 | D58 | D59 | D60 | 100 |
| | D70 | D71 | D72 | D73 | D74 | D75 | D76 | D77 | D78 | D79 | D80 | 99 |
| | D90 | D91 | D92 | D93 | D94 | D95 | D96 | D97 | D98 | D99 | D100 | 98 |
| | D110 | D111 | D112 | D113 | D114 | D115 | D116 | D117 | D118 | D119 | D120 | 97 |
| | D130 | D131 | D132 | D133 | D134 | D135 | D136 | D137 | D138 | D139 | D140 | 96 |
| | D1970 | D1971 | D1972 | D1973 | D1974 | D1975 | D1976 | D1977 | D1978 | D1979 | D1980 | 4 |
| | D1990 | D1991 | D1992 | D1993 | D1994 | D1995 | D1996 | D1997 | D1998 | D1999 | D2000 | 3 |
| | D2010 | D2011 | D2012 | D2013 | D2014 | D2015 | D2016 | D2017 | D2018 | D2019 | D2020 | 2 |
| | D2030 | D2031 | D2032 | D2033 | D2034 | D2035 | D2036 | D2037 | D2038 | D2039 | D2040 | 1 |
| | (FF) | (FF) | (FF) | (FF) | (FF) | (FF) | (FF) | C1 | C2 | C3 | C4 | 0 |
| | E10.1 | E11.1 | E12.1 | E13.1 | E14.1 | E15.1 | E16.1 | E17.1 | E18.1 | E19.1 | E20.1 | −1 |
| | E10.2 | E11.2 | E12.2 | E13.2 | E14.2 | E15.2 | E16.2 | E17.2 | E18.2 | E19.2 | E20.2 | −2 |
| | E10.3 | E11.3 | E12.3 | E13.3 | E14.3 | E15.3 | E16.3 | E17.3 | E18.3 | E19.3 | E20.3 | −3 |
| | E10.13 | E11.13 | E12.13 | E13.13 | E14.13 | E15.13 | E16.13 | E17.13 | E18.13 | E19.13 | E20.13 | −13 |
| | E10.14 | E11.14 | E12.14 | E13.14 | E14.14 | E15.14 | E16.14 | E17.14 | E18.14 | E19.14 | E20.14 | −14 |
| | E10.15 | E11.15 | E12.15 | E13.15 | E14.15 | E15.15 | E16.15 | E17.15 | E18.15 | E19.15 | E20.15 | −15 |
| | E10.16 | E11.16 | E12.16 | E13.16 | E14.16 | E15.16 | E16.16 | E17.16 | E18.16 | E19.16 | E20.16 | −16 |

FIG. 4A

| COLUMN NUMBER j | | 0 | 1 | 2 | 3 | 4 | 5 | 6 | 7 | 8 |
|---|---|---|---|---|---|---|---|---|---|---|
| SB1 | SB2 SB3 SB4 | | | | | | | | | |
| | RS1 | D1 | D2 | D3 | D4 | D5 | D6 | D7 | D8 | D9 |
| RS1 | | D21 | D22 | D23 | D24 | D25 | D26 | D27 | D28 | D29 |
| | | D41 | D42 | D43 | D44 | D45 | D46 | D47 | D48 | D49 |
| | | D61 | D62 | D63 | D64 | D65 | D66 | D67 | D68 | D69 |
| | | D81 | D82 | D83 | D84 | D85 | D86 | D87 | D88 | D89 |
| | | D101 | D102 | D103 | D104 | D105 | D106 | D107 | D108 | D109 |
| RS2 | RS2 | D121 | D122 | D123 | D124 | D125 | D126 | D127 | D128 | D129 |
| ⋮ | | | | | | | | | | |
| RS33 | RS33 | D1961 | D1962 | D1963 | D1964 | D1965 | D1966 | D1967 | D1968 | D1969 |
| | | D1981 | D1982 | D1983 | D1984 | D1985 | D1986 | D1987 | D1988 | D1989 |
| | | D2001 | D2002 | D2003 | D2004 | D2005 | D2006 | D2007 | D2008 | D2009 |
| | | D2021 | D2022 | D2023 | D2024 | D2025 | D2026 | D2027 | D2028 | D2029 |
| RS34 | RS34 | D2041 | D2042 | D2043 | D2044 | D2045 | D2046 | D2047 | D2048 (FF) | |
| | | E1.1 | E2.1 | E3.1 | E4.1 | E5.1 | E6.1 | E7.1 | E8.1 | E9.1 |
| | | E1.2 | E2.2 | E3.2 | E4.2 | E5.2 | E6.2 | E7.2 | E8.2 | E9.2 |
| RS35 | RS35 | E1.3 | E2.3 | E3.3 | E4.3 | E5.3 | E6.3 | E7.3 | E8.3 | E9.3 |
| | | E1.13 | E2.13 | E3.13 | E4.13 | E5.13 | E6.13 | E7.13 | E8.13 | E9.13 |
| | | E1.14 | E2.14 | E3.14 | E4.14 | E5.14 | E6.14 | E7.14 | E8.14 | E9.14 |
| | | E1.15 | E2.15 | E3.15 | E4.15 | E5.15 | E6.15 | E7.15 | E8.15 | E9.15 |
| RS39 | RS39 | E1.16 | E2.16 | E3.16 | E4.16 | E5.16 | E6.16 | E7.16 | E8.16 | E9.16 |

103 ROWS / 16 ROWS

ENCODING UNIT AND STORAGE UNIT USING THE SAME

BACKGROUND OF THE INVENTION

The present invention generally relates to encoding units and storage units, and more particularly to an encoding unit which is used when recording information according to a mark edge recording system and to a storage unit using such an encoding unit.

According to the conventional recording system, a central portion of a mark which is recorded on a recording medium indicates the data value. On the other hand, according to the mark edge recording system, an edge portion of the mark which is recorded on the recording medium indicates the data value. For this reason, the mark edge recording system can record information on the recording medium with a high density, and the mark edge recording system is therefore suited for recording information on optical disks such as magneto-optic disks.

A standard for recording information on the optical disk according to the mark edge recording system is proposed in "Data Interchange on 90 mm Optical Disk Cartridges", ISO/IEC JTC 1/SC 23 N705, 1.23.06, Draft 2 December 1994. A detailed description on this standard will be omitted, and only a brief description will be given hereinafter. According to this standard, sectors on a logical track of the optical disk are sequentially numbered from 0, and a sector layout shown in FIGS. 1A through 1C is employed.

FIG. 1A shows a preformatted header of the sector, FIG. 1B shows a sector format for a case where 512 user bytes are provided, and FIG. 1C shows a sector format for a case where 2048 user bytes are provided. In FIGS. 1A through 1C, SM denotes a sector mark which denotes a starting position of the sector, VFO1, VFO2 and VFO3 respectively denote VFO synchronizing fields, AM denotes an address mark having a bit pattern called RLL(1, 7) which is not generated in the run-length limited (RLL) code, ID1 and ID2 respectively denote ID fields, PA denotes a postamble, PFH denotes a preformatted header, G denotes a gap, RF denotes a recording field, S denotes a synchronizing field, DF denotes a data field, and B denotes a buffer field. In addition, a number shown below each field indicates the number of bytes.

The RLL(1, 7) modulation code which is employed in the above standard is advantageous compared to the conventional system because the RLL(1, 7) modulation code is uneasily affected by noise and it is possible to obtain a large detection margin when reproducing information from the optical disk.

On the other hand, according to the conventional system, the data recorded on the optical disk are detected by differentiation. Hence, no undesirable effects occur with respect to the slice level even if a sum total of the logic values "1" and a sum total of the logic values "0" in the data greatly differ. However, when recording the RLL(2, 7) modulation code according to the mark edge recording system by subjecting the RLL(2, 7) modulation code to a pulse width modulation (PWM), the sum total of the logic values "1" and the sum total of the logic values "0" in the data greatly differ, and a divergence may occur in a direction towards the logic value "1" or "0". As a result, there was a problem in this case because the data deviated with respect to the slice level of a PWM reproducing circuit which carries out the data detection using no differentiation.

If the RLL(1, 7) modulation code is recorded according to the mark edge recording system and the sum total of the logic values "1" and the sum total of the logic values "0" in the data greatly differ, an average value of D.C. components in the signals reproduced from the optical disk within 1 sector becomes too large or too small. In this case, it becomes difficult to set the slice level which is used when binarizing the reproduced signals, and there was a problem in that it is difficult to accurately reproduce the recorded data.

Although there is a proposal to minimize the fluctuation or instability of the D.C. level of the data pattern in the data field within the sector by appropriately switching the pattern of resynchronizing bytes in the above standard, effective and concrete means have yet to be proposed to realize this proposal.

SUMMARY OF THE INVENTION

Accordingly, it is a general object of the present invention to provide a novel and useful encoding unit and storage unit, in which the problems described above are eliminated.

Another and more specific object of the present invention is to provide an encoding unit and a storage unit having such an encoding unit which conform to the above standard, wherein the slice level margin at the time of the data reproduction can be made large by maintaining the D.C. components of the reproduced signal constant with respect to arbitrary data, the stability and reliability of the data reproduction are improved, and the fluctuation or instability of the D.C. level of the data pattern is suppressed to a minimum.

Still another object of the present invention is to provide an encoding unit which encodes data to be recorded on a recording medium, comprising first means for inserting resynchronizing bytes between two data blocks within a data field when converting data coded by a predetermined modulation code which generates patterns having D.C. components into pulse width modulation data, where the resynchronizing bytes have resynchronizing patterns and achieve synchronization when a clock slip occurs within the data field, second means for calculating a digital sum value for a predetermined data block, where the digital sum value indicates a difference between a sum total of logic values "1" and a sum total of logic values "0" in the pulse width modulation data, and third means for controlling the first means so that the resynchronizing bytes having resynchronizing patterns that minimize the digital sum value is inserted in a present data block. According to the encoding unit of the present invention, it is possible to calculate the digital sum value by hardware when selecting the resynchronizing pattern of the resynchronizing bytes so that the digital sum value becomes a minimum. Hence, it is possible to conform to the proposed standard described above, and the stability and reliability of the data reproduction can be improved because the D.C. components of the reproduced signals can be maintained constant with respect to arbitrary data. In addition, it is possible to suppress the D.C. level fluctuation of the data pattern to a minimum.

A further object of the present invention is to provide a storage unit which encodes and records data on a recording medium, comprising first means for inserting resynchronizing bytes between two data blocks within a data field when converting data coded by a predetermined modulation code which generates patterns having D.C. components into pulse width modulation data, where the resynchronizing bytes have resynchronizing patterns and achieve synchronization when a clock slip occurs within the data field, second means for calculating a digital sum value for a predetermined data block, where the digital sum value indicates a difference between a sum total of logic values "1" and a sum total of logic values "0" in the pulse width modulation data, third means for controlling the first means so that the resynchronizing bytes having resynchronizing patterns that minimize the digital sum value is inserted in a present data block, and recording means for recording the pulse width modulation data obtained by the first means on the recording medium. According to the storage unit of the present invention, it is possible to calculate the digital sum value by hardware when selecting the resynchronizing pattern of the resynchronizing bytes so that the digital sum value becomes a minimum. Hence, it is possible to conform to the proposed standard described above, and the stability and reliability of the data reproduction can be improved because the D.C. components of the reproduced signals can be maintained constant with respect to arbitrary data. In addition, it is possible to suppress the D.C. level fluctuation of the data pattern to a minimum.

Other objects and further features of the present invention will be apparent from the following detailed description when read in conjunction with the accompanying drawings.

BRIEF DESCRIPTION OF THE DRAWINGS

FIGS. 1A through 1C respectively are diagrams for explaining a sector layout of a proposed standard;

FIG. 2 is a diagram for explaining conversion of input bits to channel bits;

FIG. 3 is a diagram for explaining a recording sequence within a data field when a sector has 512 bytes and ECC employs 5-way interleave;

FIG. 4, which is divided into two sections 4A and 4B, is a diagram for explaining a recording sequence within the data field when the sector has 2048 bytes and the ECC employs 20-way interleave;

DESCRIPTION OF THE PREFERRED EMBODIMENTS

Figure 5:
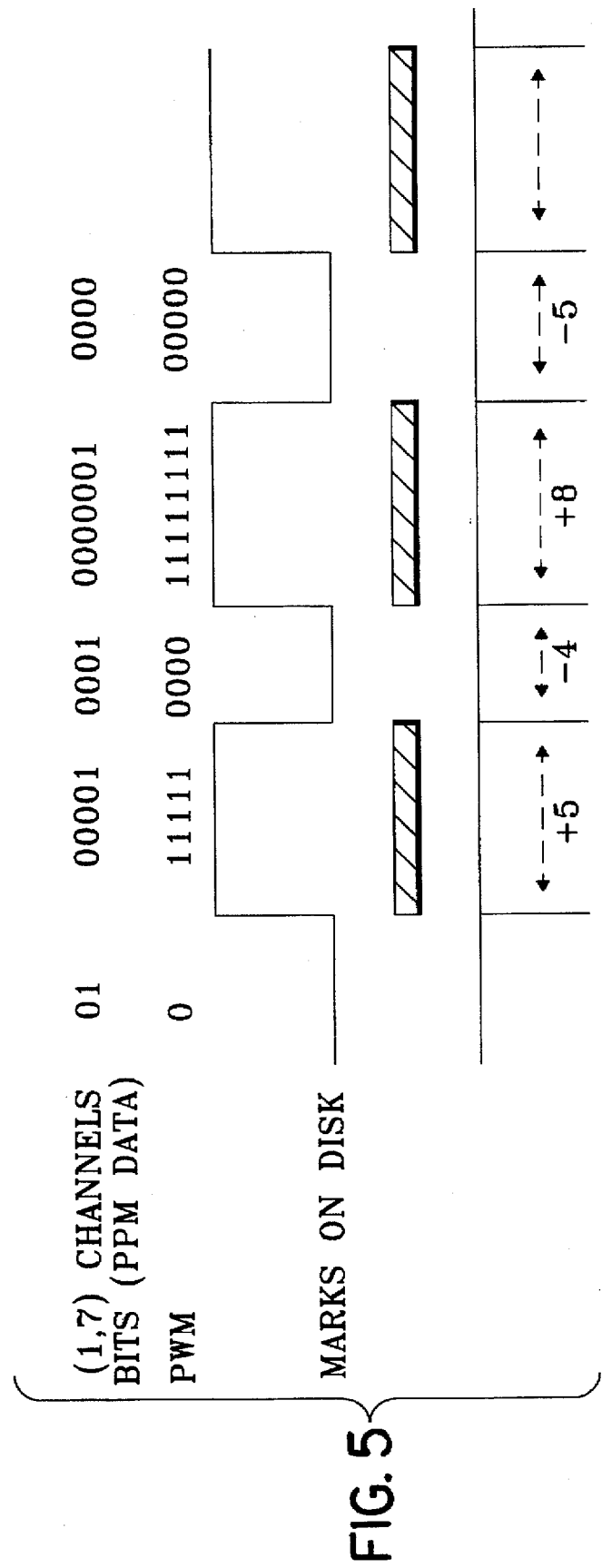
FIG. 5 is a diagram for explaining the relationship of PPM data and PWM data and marks recorded on an optical disk.

According to the standard described above with reference to FIGS. 1A through 1C, the data field DF includes user data bytes to which the user can freely write data, cyclic redundancy check (CRC) bytes written with CRC codes which are used for error detection, error correction code (ECC) bytes written with ECC codes which are used for error correction, and resynchronizing bytes. The resynchronizing bytes are provided to prevent errors within the user data from spreading by making a resynchronization when a clock slip is generated within the data field DF due to a large defect or the like. The resynchronizing bytes have either one of the following resynchronizing patterns respectively made up of channel bits amounting to 2 bytes, where X and Y are set to "0" or "1" based on the data pattern immediately before or immediately after. These resynchronizing patterns are denoted by RSA and RSB which are 2 kinds of patterns that will not be generated according to the RLL(1, 7) modulation code.

RSA: 0X0 100 000 001 000 000 100 00Y
RSB: 0X0 100 000 001 000 000 101 00Y

The RLL(1, 7) modulation code which is used to record all data in the formatted regions on the optical disk is defined as shown in FIG. 2. FIG. 2 shows a case where input bits are converted into channel bits. In FIG. Z, "not 00" indicates that it is "01","10" or "11", and "X" indicates that the value is "0" or "1". The RLL(1, 7) modulation coding (encoding) is started from the first bit of the first byte of the field which is to be converted, and after the resynchronizing region, the coding is restarted from the last 2 input bits of the resynchronizing byte.

The recording within the data field DF is carried out in the sequence shown in FIGS. 3 and 4. FIG. 3 shows a case where the sector has 512 bytes and the ECC uses 5-way interleave, and FIG. 4 shows a case where the sector has 2048 bytes and the ECC uses 20-way interleave. In FIGS. 3 and 4, the recording is carried out from the left to right and from the top to bottom. In addition, SB denotes a synchronizing byte, D denotes a user byte, RS denotes a resynchronizing byte, C denotes a check byte for CRC, E denotes a check byte for ECC, and Fm denotes a FF byte.

Accordingly, in the case shown in FIG. 3, the first 104 rows include the user bytes in the columns 0 to 4, 4 FF bytes and 4 check bytes for CRC, and the next 18 rows include only the check bytes for ECC. On the other hand, in the case shown in FIG. 4, which is divided into two sections 4A and 4B, the first 103 rows include the user bytes in the columns to 19, 8 FF bytes and 4 check bytes for CRC, and the next 16 rows include only the check bytes for ECC.

According to the above described standard, in order to minimize the fluctuation of the D.C. level of the data pattern in the data field within the sector, it is possible to switch the sum total of the values "1" within the pattern of the resynchronizing bytes from an odd number to an even number or vice versa. In other words, the resynchronizing pattern which can suppress the D.C. level fluctuation to a minimum is selected between the 2 kinds of resynchronizing patterns RSA and RSB of the resynchronizing bytes.

The resynchronizing pattern to be used is determined in the following manner. First, channel bits described by pulse position modulation (PPM) data are converted into PWM data in order to simplify the processing. For example, if the PPM data is ". . . 0010100010010 . . .", this PPM data is converted into the PWM data ". . . 0011000011100 . . .". Then, the logic value "0" of the PWM data is regarded as "−1" and the logic value "1" of the PWM data is regarded as "+1", and a digital sum value (DSV) is calculated. The DSV is the difference between the number of logic values "1" in the PWM data and the number of logic values "0" in the PWM data.

FIG. 5 shows the relationship of the PPM data, the PWM data and the mark recorded on the optical disk for this particular case. In this case, DSVm is calculated from DSVm=(+5−4+8−5 . . . ). When recording the data on the optical disk, the D.C. level fluctuation of the data pattern can be suppressed to a minimum if the DSVm is a minimum.

The resynchronizing region is divided into 2 parts (RS||INV), and these divided parts are defined by the following formulas using the PPM data.

RS=0X010000000100000010

INV=00Y(INV1) or 100Y(INV2)

In addition, the user data can be defined by the following when m=1, . . . , N, N=39 for the case where the sector has 1024 bytes, and N=30 for the case where the sector has 512 bytes.

VF02||SYNC||B0||RS1||INV1(or INV2)||B1||RS2||. . . ||(or INV2)||Bm||RSm+1||. . . ||INV1(or INV2)||BN

A function DSV(z) is defined so that an argument (z) which is a PPM data stream becomes the sum of the PWM data based on the last PWM state of the PWM data immediately preceding the data in the argument (z).

In addition, INV1 or INV2 is selected in m steps using the following algorithm.

$$P0=DSV(VFO2||SYNC||B0||RS1)$$

$$Pm=Pm-1+DSV(INV1||Bm||RSm+1)$$

or $$Pm=Pm-1+DSV(INV2||Bm||RSm+1)$$

select INV1 or INV2 to minimize |Pm|

$$PN=PN-1+DSV(INV1||BN)$$

or $$PN=PN-1+DSV(INV2||BN)$$

select INV1 or INV2 to minimize |PN|

This process following the above algorithm is repeated from m=1 to N, where N=39 in the case where the sector has 1024 bytes and N=30 in the case where the sector has 512 bytes. If |Pm| takes the same value for the two resynchronizing patterns RSA and RSB, the first resynchronizing pattern RSA of the resynchronizing patterns RSA and RSB is selected.

As described above, when converting the RLL(1, 7) modulation code into the PWM data, the parts with the value "1" and the parts with the value "0" in the PWM data in the following data block are interchanged (or switched) depending on the number of "1"s included in the resynchronizing pattern of the resynchronizing bytes between two data blocks. Hence, according to the above standard, this nature is utilized to minimize the D.C. level fluctuation of the data pattern in the data field within the sector.

In other words, in the case of a repeating pattern which is "598" in NRZ data, that is, ". . . 0101000000101000000101000000101000000 . . ." which is a repetition of a 1T/6T pattern in the RLL(1, 7) modulation code, for example, it is possible to effectively suppress the D.C. level fluctuation of the data pattern by inverting the PWM data at the resynchronizing byte portion.

It is conceivable to carry out the calculation of the DSV by software. However, when carrying out the calculation by software, it is. necessary to finish the calculation of the DSV in a sector prior to a specific sector which is to be processed. As a result, the load on a microprocessor unit (MPU) or the like which carries out the calculation becomes large, and it is difficult to calculate the DSV in real-time when the calculation speed of the software is taken into consideration. In addition, while the MPU or the like calculates the DSV, the MPU or the like cannot carry out other processes, and the other processes must wait. For these reasons, it is not very realistic to calculate the DSV by software.

In the present invention, the DSV is calculated by hardware so that the DSV can be calculated in real-time. In addition, the resynchronizing pattern is selected and generated so that the DSV becomes a minimum by use of the result of the DSV calculation which is carried out by the hardware, and the resynchronizing pattern is inserted into the data that are recorded on the optical disk, thereby making it possible to improve the stability and reliability of the data reproduction.

Figure 6:
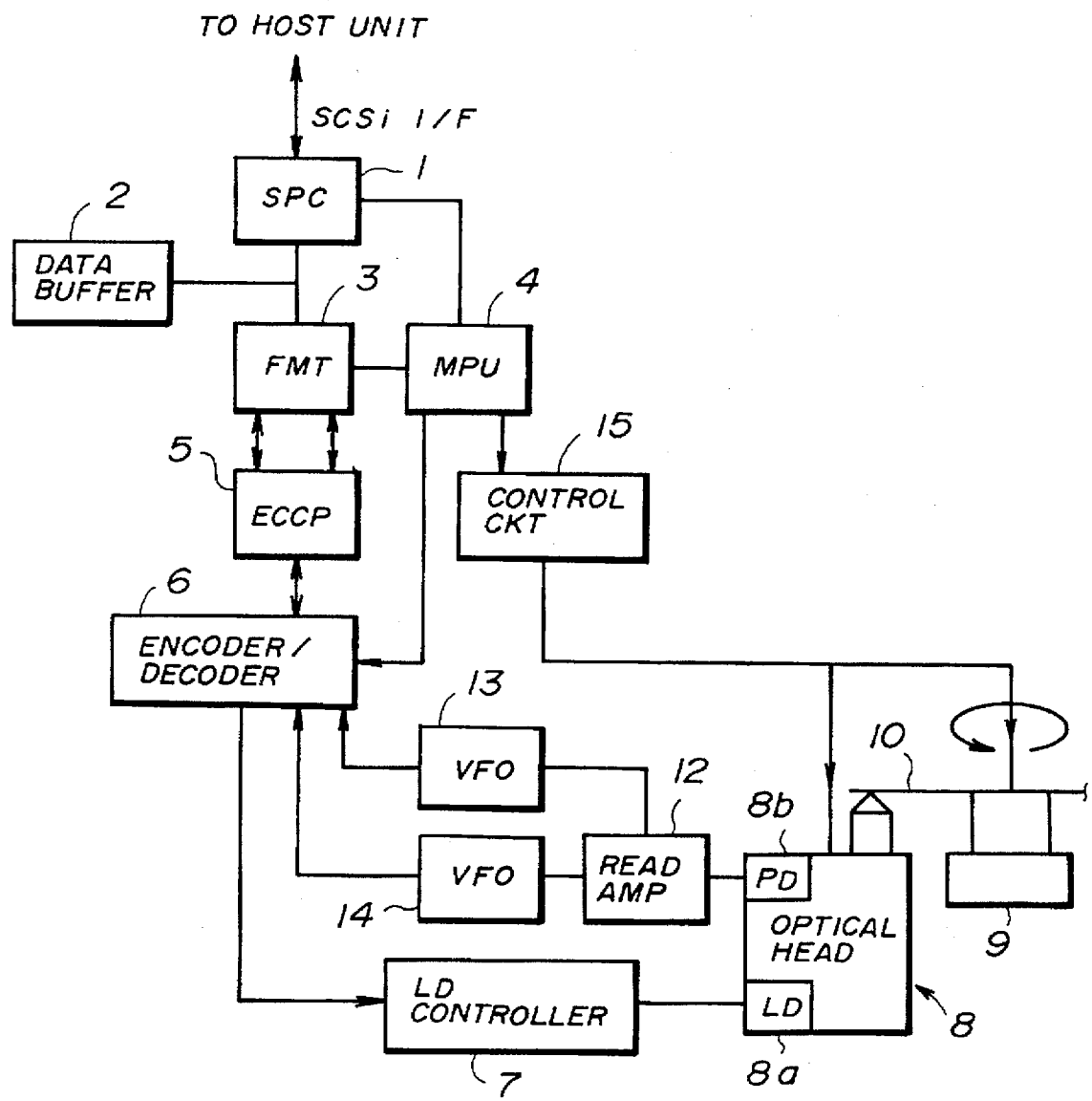
FIG. 6 is a system block diagram showing the general construction of an embodiment of a storage unit according to the present invention.
Figure 8:
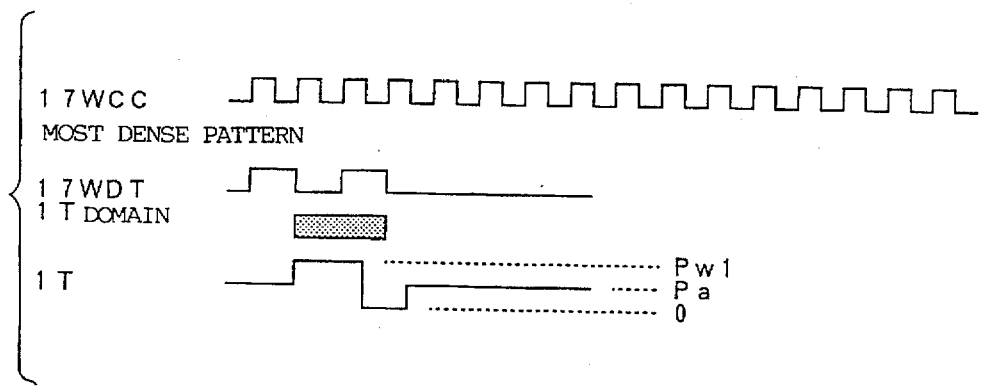
FIG. 8 is a diagram for explaining the relationship of a channel bit clock 17WCC, a data stream 17WDT, a domain of the mark on the optical disk, and an output level of a pulse stream generator for a case where the pattern recorded on the optical disk is a most dense (IT) pattern.

FIG. 8 is a system block diagram showing the general construction of an embodiment of a storage unit according to the present invention. In this embodiment, the present invention is applied to an optical disk unit. In FIG. 6, the optical disk unit includes a SCSi protocol controller (SPC) 1, a data buffer 2, a formatter (FMT) 3, a MPU 4, an ECC processor (ECCP) 5, an encoder/decoder 6, a laser diode (LD) controller 7, an optical head 8 which includes a laser diode (LD) 8a and a photodiode (PD) 8b, a spindle motor 9 which rotates an optical disk 10, a read amplifier 12, VFO (PLL: phase locked loop) circuits 13 and 14, and a control circuit 15.

The SPC 1 is coupled to a host unit (not shown) such as a personal computer and a work station via a SCSi interface, and controls the SCSi protocol. The SPC 1 transfers the data from the host unit to the data buffer 2, and transfers the data from the data buffer 2 to the host unit. The MPU 4 analyzes a command from the SPC 1 and instructs a data transfer. The MPU 4 also controls various driving parts such as a head driving part (not shown) and a spindle motor driving part (not shown) of the optical disk unit via the control circuit 18, so that the optical head 8 scans a desired recording position on the optical disk 10. In addition, the MPU 4 controls the FMT 3 so as to transmit the data which are to be recorded on the optical disk 10 and are stored within the data buffer 2. The ECCP 5 adds the ECC to the data which are to be recorded on the optical disk 10.

The encoder/decoder 6 encodes the data obtained via the ECCP 5, and controls a laser diode current which is supplied to the laser diode 8a of the optical head 8 via the LD controller 7. The encoding is made up of 2 stages, and the data are first encoded into the RLL(1, 7) modulation code, and the RLL(1, 7) modulation code is then encoded (that is, converted) into the PWM data. A laser beam emitted from the laser diode 8a is irradiated on the optical disk 10, thereby recording marks indicative of the data onto the optical disk 10.

On the other hand, the laser beam which is reflected by and received from the optical disk 10 by the photodetector 8b of the optical head 8 is converted into a current. This current is amplified and converted into a binary signal by the read amplifier 12 before being supplied to the VFO circuits 13 and 14. Reproduced data from the VFO circuits 13 and 14 are decoded by the encoder/decoder 6.

The optical disk unit applied with the present invention is characterized by the encoder/decoder 6 shown in FIG. 6, and known circuits and the like may be used for parts of the optical disk unit other than the encoder/decoder 6. For example, the part made up of the SPC 1, the FMT 3 and the ECCP 5 may be realized by a semiconductor chip MB86506, and the MPU 4 may be realized by a semiconductor chip 68302.

Figure 7:
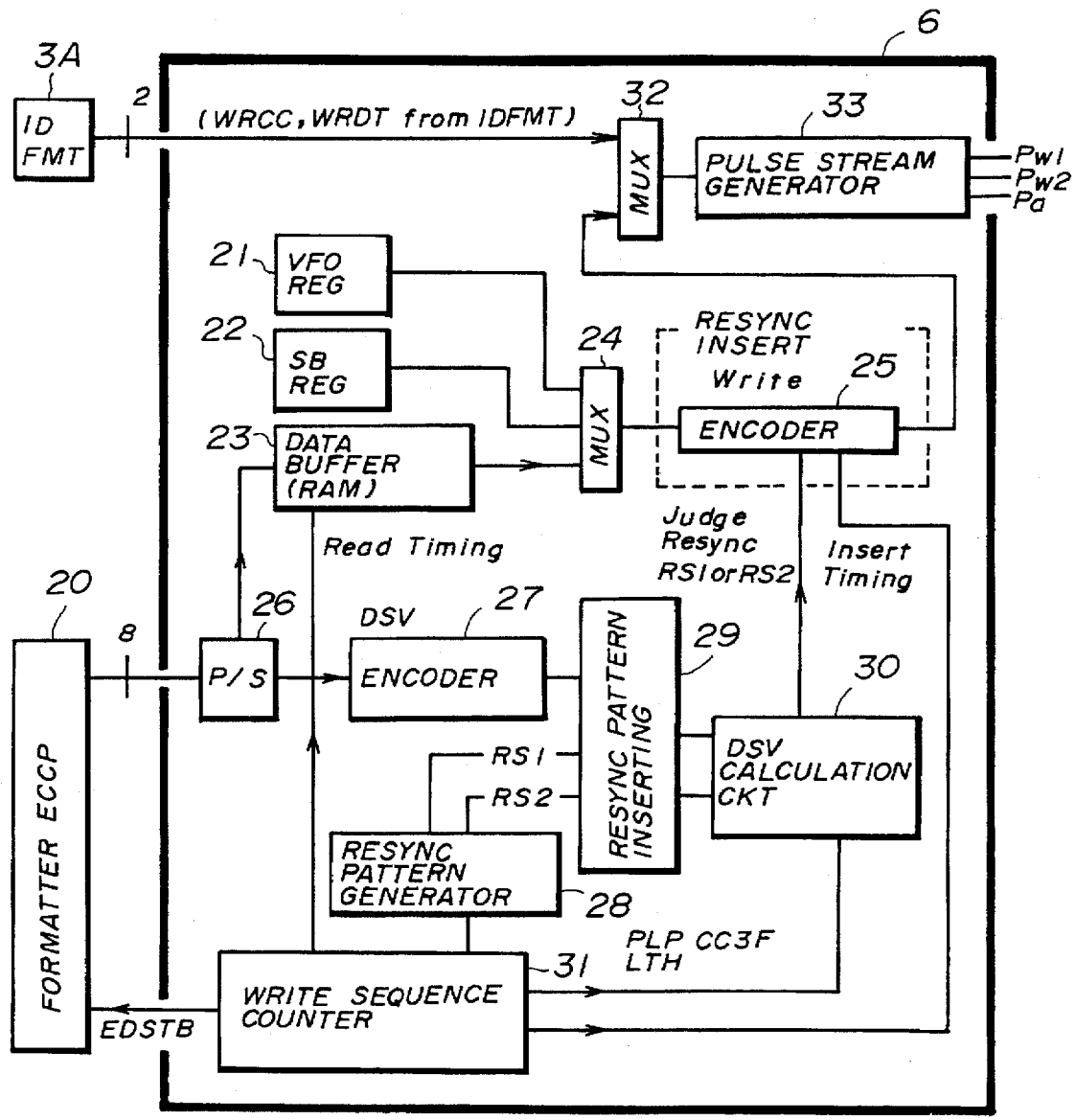
FIG. 7 is a system block diagram showing an embodiment of an encoder/decoder.

FIG. 7 is a system block diagram showing an embodiment of the encoder/decoder 6. In FIG. 7, a semiconductor chip 20 is made up of the SPC 1, the FMT 3 and the ECCP 5 shown in FIG. 6. For example, a semiconductor chip (formatter ECCP) MB86506 may be used as this semiconductor chip 20. An encoder part of the encoder/decoder 6 includes a VFO register 21, a synchronizing byte register 22, a data buffer 23 which is made up of a random access memory (RAM) or the like, a multiplexer 24, an encoder 25, a parallel-to-serial (P/S) converter 26, an encoder 27, a resynchronizing pattern generator 28, a resynchronizing pattern inserting circuit 29, a DSV calculation circuit 30, a write sequence counter 31, a multiplexer 32, and a pulse stream generator 33. The encoder part of the encoder/decoder 6 corresponds to an embodiment of an encoding unit according to the present invention.

The write sequence counter 31 generates various timing signals based on clock signals such as a channel bit clock and a byte clock. These timing signals from the write sequence counter 31 are used to control the operation timings of various parts within the encoder/decoder 6. 1 channel bit clock corresponds to 1 bit of data in the RLL(1, 7) modulation code. In addition, the byte clock in this embodiment is obtained by frequency-dividing the channel bit clock by 12.

The VFO register 21 stores the VFO pattern which is written in the VFO synchronizing field, and the synchronizing byte register 22 stores the synchronizing byte which is written in the synchronizing field. The data buffer 23 stores 20 to 30 bytes of data which are obtained from the semiconductor chip 20 via the P/S converter 26, that is, data amounting to 1 data block. As described above, the DSV of the present data block must be calculated in advance using the resynchronizing bytes of the preceding data block. Hence, in this embodiment, the data are supplied to the data buffer 23 1 data block before the data are supplied to the encoder 27. In other words, the data are read from the data buffer 23 after the result of the DSV calculation is obtained from the DSV calculation circuit 30. The data are read from the data buffer 23 with a read timing which is controlled based on a read timing signal from the write sequence counter 31. The VFO pattern from the VFO register 21, the synchronizing byte from the synchronizing byte register 22, and the data from the data buffer 23 are multiplexed by the multiplexer 24 and encoded into the RLL(1, 7) modulation code by the encoder 25. When carrying out this encoding, the encoder 25 inserts the resynchronizing pattern which makes the DSV obtained from the DSV calculation circuit 30 a minimum, with a timing which is based on an insert timing signal from the write sequence counter 31. The DSV calculation circuit 30 will be described later. The RLL(1, 7) modulation code output from the encoder 25 is supplied to the multiplexer 32 which will be described later.

In this embodiment, the number of bytes of the data buffer 23 can be changed arbitrarily from the MPU 4 shown in FIG. 6. The resynchronizing pattern RSA or RSB which is supplied to the encoder 25 may be supplied from the resynchronizing pattern generator 28 via the resynchronizing pattern inserting circuit 29 and the DSV calculation circuit or, the resynchronizing patterns RSA and RSB may be stored in the synchronizing byte register 22 and the stored resynchronizing pattern RSA or RSB may be supplied to the encoder 25 via the multiplexer 24.

On the other hand, the data from the P/S converter 26 are encoded into the RLL(1, 7) modulation code by the encoder 27 and then supplied to the resynchronizing pattern inserting circuit 29. The resynchronizing pattern generator 28 generates the 2 kinds of resynchronizing patterns RSA and RSB based on the timing signal from the write sequence counter 31 and supplies the resynchronizing patterns RSA and RSB to the resynchronizing pattern inserting circuit 29. The resynchronizing pattern inserting circuit 29 inserts the resynchronizing patterns RSA and RSB into the RLL(1, 7) modulation code, and the DSV calculation circuit 30 calculates the DSV with respect to each of the resynchronizing patterns RSA and RSB in response to the timing signal from the write sequence counter 31, based on the RLL(1, 7) modulation code from the resynchronizing pattern inserting circuit 29. In addition, the DSV calculation circuit 30 supplies one of the resynchronizing patterns RSA and RSB which makes the DSV a minimum to the encoder 25.

The RLL(1, 7) modulation code from the encoder 25 and a format code from an ID formatter 3A are supplied to the multiplexer 32. The pulse stream generator 33 can operate in modes other than the RLL(1, 7) mode. For example, the pulse stream generator 33 can operate in a RLL(2, 7) mode, an erase mode, and an ID format mode. In the RLL(2, 7) mode, the pulse stream generator 33 outputs a write pulse having a width 3T/2 with a level corresponding to a write power Pw1 of the laser diode 8a at the start of the recording, and sets the write power of the laser diode 8a to 0 for only a width 1T at the end of the recording. With respect to write data of 2T or greater, the pulse stream generator 33 adds a pulse stream having a width T/2 with a level corresponding to a write power Pw2 of the laser diode 8a. The other modes of the pulse stream generator 33 are not directly related to the subject matter of the present invention, and a description on these other modes will be omitted in this specification.

FIG. 8 is a diagram for explaining the relationship of a channel bit clock 17WCC, a data stream 17WDT, a domain of the mark on the optical disk 10, and the output level of the pulse stream generator 33 for a case where the pattern recorded on the optical disk 10 is a most dense (1T) pattern. In this case, there is no pulse stream to be added to the latter half of the write pulse, and the write power is only dependent upon Pa and Pw1.

Figure 9:
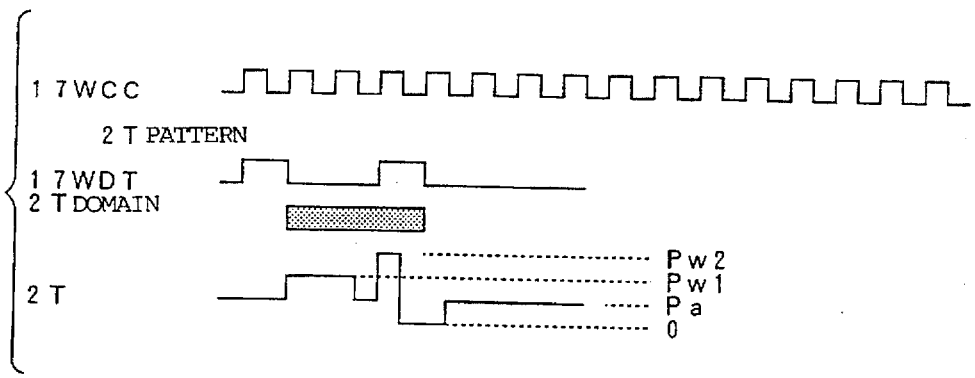
FIG. 9 is a diagram for explaining the relationship of the channel bit clock 17WCC, the data stream 17WDT, the domain of the mark on the optical disk, and the output level of the pulse stream generator for a case where the pattern recorded on the optical disk is a 2T pattern.

FIG. 9 is a diagram for explaining the relationship of the channel bit clock 17WCC, the data stream 17WDT, the domain of the mark on the optical disk 10, and the output level of the pulse stream generator 33 for a case where the pattern recorded on the optical disk 10 is a 2T pattern. In this case, there is no pulse stream to be added to the latter half of the write pulse, and the write power is dependent upon Pa, Pw1 and Pw2.

Figure 10:
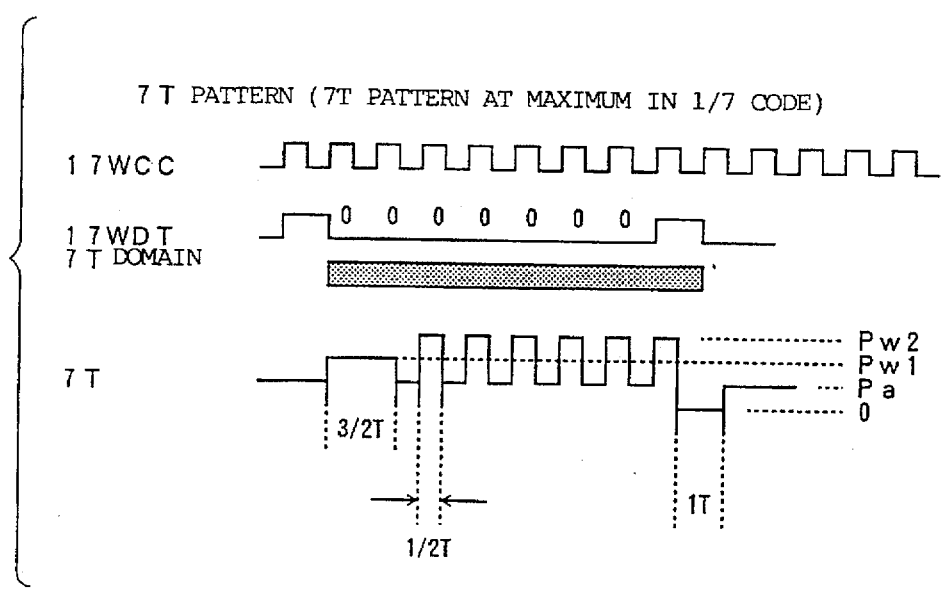
FIG. 10 is a diagram for explaining the relationship of the channel bit clock 17WCC, the data stream 17WDT, the domain of the mark on the optical disk, and the output level of the pulse stream generator for a case where the pattern recorded on the optical disk is a most coarse (7T) pattern of the RLL(1, 7) modulation code.

FIG. 10 is a diagram for explaining the relationship of the channel bit clock 17WCC, the data stream 17WDT, the domain of the mark on the optical disk 10, and the output level of the pulse stream generator 33 for a case where the pattern recorded on the optical disk 10 is a most coarse (7T) pattern. In this case, there exists a pulse stream to be added to the latter half of the write pulse, and the write power is dependent upon Pa, Pw1 and Pw2.

Figure 11:
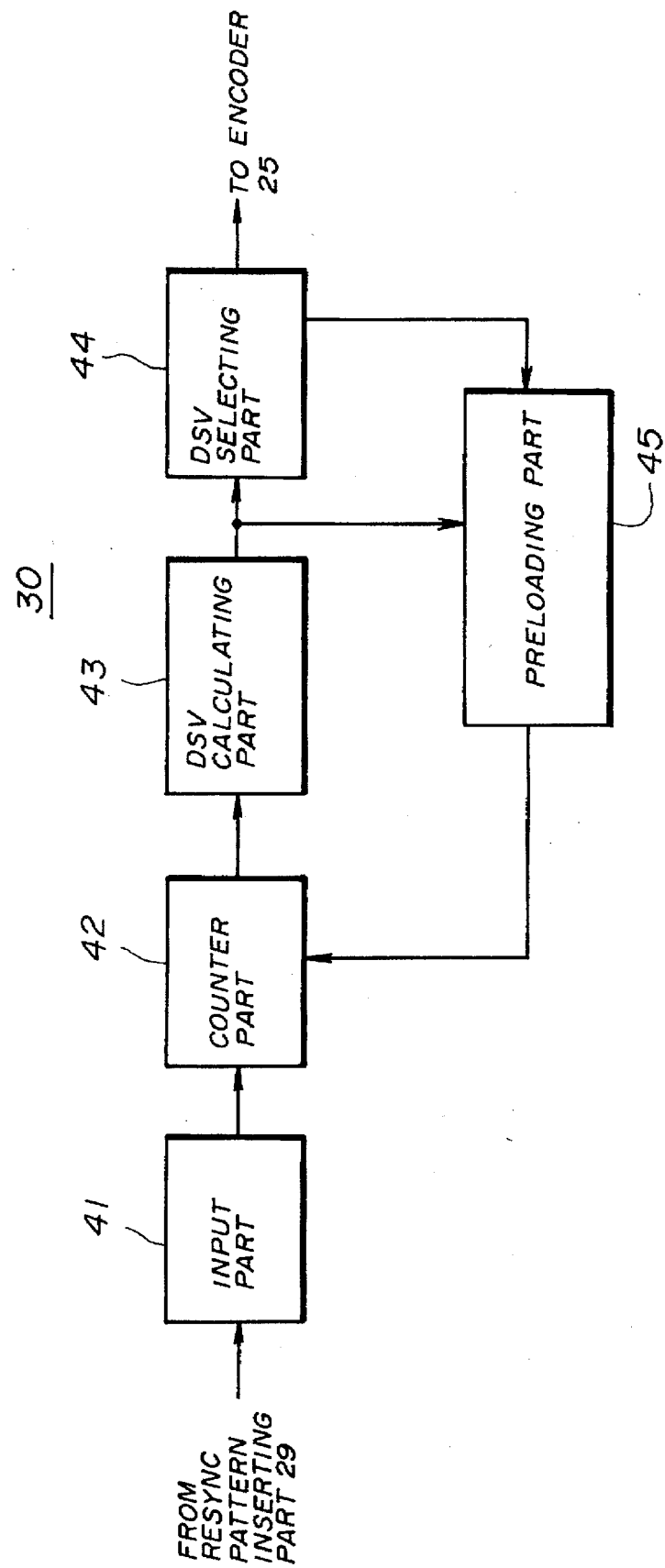
FIG. 11 is a system block diagram showing an embodiment of a DSV calculation circuit.

FIG. 11 is a system block diagram showing an embodiment of the DSV calculation circuit 30. In FIG. 11, the DSV calculation circuit 30 includes an input part 41, a counter part 42, a DSV calculating part 43, a DSV selecting part 44, and a preloading part 45.

Figure 12:
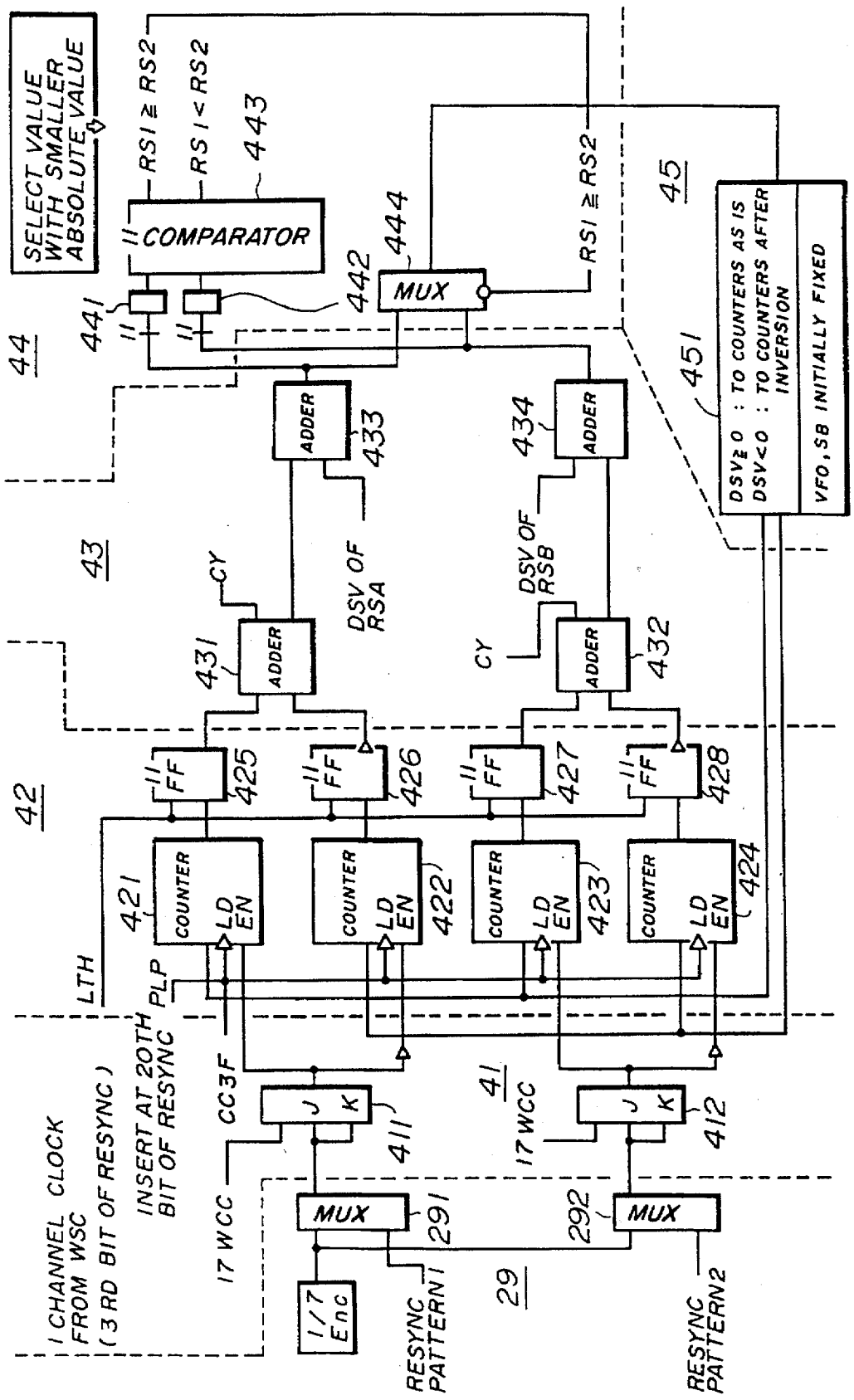
FIG. 12 is a system block diagram showing the construction of the DSV calculation circuit shown in FIG. 11 in more detail.

FIG. 12 is a system block diagram showing the construction of the DSV calculation circuit 30 shown in FIG. 11 in more detail. In FIG. 12, the input part 41 includes JK flip-flops 411 and 412. The counter part 42 includes counters 421 through 424 and D flip-flops 425 through 428. The DSV calculating part 43 includes adders 431 through 434. The DSV selecting part 44 includes absolute value circuits 441 and 442, a comparator 443, and a multiplexer 444. In addition, the preloading part 45 includes a preloading circuit 451.

The resynchronizing pattern inserting circuit 29 includes multiplexers 291 and 292. The multiplexer 291 receives the RLL(1, 7) modulation code from the encoder 27 shown in FIG. 7 and the resynchronizing pattern RSA from the resynchronizing pattern generator 28. The multiplexer 292 receives the RLL(1, 7) modulation code from the encoder 27 and the other resynchronizing pattern RSB from the resynchronizing pattern generator 28.

Accordingly, the data stream 17WDT which is converted into the RLL(1, 7) modulation code is input to a J-input terminal and a K-input terminal of the JK flip-flop 411 of the input part 41, and the channel bit clock 17WCC is input to a clock input terminal of the JK flip-flop 411. Similarly, the data stream 17WDT which is converted into the RLL(1, 7) modulation code is input to a J-input terminal and a K-input terminal of the JK flip-flop 412 of the input part 41, and the channel bit clock 17WCC is input to a clock input terminal of the JK flip-flop 412. As a result, the input part 41 synchronizes the data by latching the data stream 17WDT by the channel bit clock 17WCC. Next, the JK flip-flops 411 and 412 causes the channel bit clock 17WCC to toggle, so that the PWM data (write pulse) for the mark edge recording is generated. The PWM data is input to enable input terminals EN of each of the counters 421 through 424 of the counter part 42, but the PWM data is inverted before being input to the enable input terminals EN of the counters 422 and 424.

In FIG. 12, generally the upper portions of the input part 41, the counter part 42, the DSV calculating part 43 and the preloading part 45 form a circuit part for inserting the resynchronizing pattern RSA. On the other hand, generally the lower portions of the input part 41, the counter part 42, the DSV calculating part 43 and the preloading part 45 form a circuit part for inserting the resynchronizing pattern RSB.

A preload pulse CC3F from the write sequence counter 31 shown in FIG. 7 is inverted and input to load input terminals LD of each of the counters 421 through 424 of the input part 41. In addition, a load value from the preloading part 45 which will be described later is input to load value input terminals of each of the counters 421 through 424 of the input part 41.

The counter part 42 independently counts the "1"s and the "0"s of the PWM data. In other words, the counter 421 counts the "1"s of the PWM data, and the counter 422 counts the "0"s of the PWM data, so that the respective lengths of the "1"s and "0"s are measured. Similarly, the counter 423 counts the "1"s of the PWM data, and the counter 424 counts the "0"s of the PWM data, so that the respective lengths of the "1"s and "0"s are measured. Outputs of the counters 421 through 424 are input to the corresponding flip-flops 425 through 428, and are latched by a latch clock LTH which becomes active at the third bit of the resynchronizing byte, for example. Hence, it is possible to keep the DSV up to that point in time.

The latch clock LTH is supplied from the write sequence counter 31. The active timing of the latch clock LTH is not limited to the third bit of the resynchronizing byte, and the active timing may be the third or subsequent bit of the resynchronizing bytes and 5 or more bits before the last bit of the resynchronizing byte. By setting the latch timing of the DSV to a time which is immediately after or as soon as possible after the value becomes definite (or settles) in the encoder 27 shown in FIG. 7, it becomes possible to set the start timing of the DSV calculation as early as possible and thereby positively secure the time for calculating the DSV.

An output of the flip-flop 425 and an inverted output of the flip-flop 426 are input to the adder 431 of the DSV calculating part 43. Hence, the DSV which is the difference between the number of "1"s and the number of "0"s in the latched PWM data is calculated. In addition, an output of the flip-flop 427 and an inverted output of the flip-flop 428 are input to the adder 432 of the DSV calculating part 43. Accordingly, the DSV which is the difference between the number of "1"s and the number of "0"s in the latched PWM data is calculated.

In this embodiment, a data "1" is input to carry input terminals CY of the adders 431 and 432, so as to correct an error in which the added value becomes "1" less at the time of the addition due to the bit inversion inputs of the counters 422 and 424 of the counter part 42.

In addition, since resynchronizing pattern RSB can be generated by inserting "1" at the twenty-first bit of the resynchronizing bytes having the resynchronizing pattern RSA, the DSV is the same up to the twentieth bit of the resynchronizing bytes having the resynchronizing patterns RSA and RSB. For this reason, using the fact that the DSV of the resynchronizing patterns RSA and RSB is the same for the 2 systems up to the twentieth bit of the resynchronizing bytes, the preload pulse CC37 is first input to the load input terminals LD of the counters 421 through 424, and the load value from the preloading part 45 is input thereafter to the load value input terminals and preloaded in response to a preload pulse PLP which is input from the write sequence counter 31 at the twentieth bit of the resynchronizing bytes so as to add the DSVs in the adders 431 and 432 immediately after the DSVs are latched.

The DSV output from the adder 431 is added with the DSV of the resynchronizing pattern RSA in the adder 433. Similarly, the DSV output from the adder 432 is added with the DSV of the resynchronizing pattern RSB in the adder 434. The DSVs of the resynchronizing patterns RSA and RSB respectively are ±3, and the DSVs of the resynchronizing patterns RSA and RSB are selected depending on the state of the PWM data before the DSVs are latched in the counter part 42. In this embodiment, if the PWM data that is latched at the third bit of the resynchronizing bytes is positive, the DSVs of the resynchronizing patterns RSA and RSB are positive. Hence, the adder 433 outputs the DSV with respect to the PWM data that is inserted with the resynchronizing pattern RSA, and the adder 434 outputs the DSV with respect to the PWM data that is inserted with the resynchronizing pattern RSB.

Carry bits of the adders 433 and 434 are used as bits for judging whether the DSVs are positive or negative. For example, if the carry bits are "1", it is indicated that the DSVs output from the adders 433 and 434 are positive.

The DSVs output from the adders 433 and 434 are input to the corresponding absolute value circuits 441 and 442 within the DSV selecting part 44. Absolute values of the DSVs output from the absolute value circuits 441 and 442 based on the carry bits of the adders 433 and 434 are input to the comparator 443. The comparator 443 outputs a selection signal which selects the resynchronizing pattern RSA or RSB so that the DSV with the smaller absolute value is selected. This selection signal is input to the multiplexer 444, and the smaller DSV between the DSVs output from the adders 433 and 434 is output from the multiplexer 444. This selection signal is also input to the encoder 25 shown in FIG. 7. The DSV output from the multiplexer 444 is input to the preloading circuit 451 of the preloading part 45.

If the absolute values of the DSVs output from the absolute value circuits 441 and 442 are equal, the resynchronizing pattern RSA or RSB is selected according to the following rule, where DSV1 denotes the DSV output from the adder 433 and DSV2 denotes the DSV output from the adder 434. In other words, the resynchronizing pattern RSA is selected when DSV1=DSV2, the resynchronizing pattern RSB is selected when DSV1>0 and DSV2<0, and the resynchronizing pattern RSA is selected when DSV1<0 and DSV2>0.

In the preloading part 45, the preloading circuit 451 inputs the DSV output from the multiplexer 444 of the DSV selecting part 44 as it is to the counters 421 and 423 of the counter part 42 as the load value when the DSV output from the multiplexer 444 satisfies DSV≧0. On the other hand, if the DSV output from the multiplexer 444 of the DSV selecting part 44 satisfies DSV<0, this DSV output from the multiplexer 444 is inverted before being input to the counters 422 and 424 of the counter part 42 as the load value.

The DSV which has the smaller absolute value and is selected by the multiplexer 444 of the DSV selecting part 44 must be preloaded to the counters 421 through 424 of the counter part 42 as the load value before the next calculation is carried out. Hence, in this embodiment, the load value from the preloading circuit 451 is preloaded into the counters 421 through 424 in response to the preload pulse PLP at the twentieth bit of the resynchronizing bytes. In addition, when the loading of the data into the counters 421 through 424 within the counter part 42, it is desirable that the DSVs of the synchronizing fields VFO and the synchronizing bytes SB are calculated prior to calculating the DSV of the first data block. In this case, the DSVs of the synchronizing fields VFO and the synchronizing bytes SB which are calculated beforehand are stored in a register (not shown), and the stored DSVs are read and loaded into the counters 421 through 424 before starting the calculation of the DSV.

In the circuit system shown at the upper or lower portion of FIG. 12 which processes the DSV which is not selected by the DSV selecting part 44, the PWM data inserted with the resynchronizing bytes have opposite polarities compared to the PWM data in the circuit system at the other portion of FIG. 12 at twentieth and subsequent bits of the resynchronizing bytes. Hence, it is necessary to invert the polarity of the PWM data somewhere at the resynchronizing bytes. In this embodiment, the polarity of the PWM data in the circuit system which processes the DSV that is not selected by the DSV selecting part 44 is inverted between the fourteenth to the seventeenth bits of the resynchronizing bytes.

Although the above described embodiment employs the RLL(1, 7) modulation code, the present invention is not limited to such, and similar effects can be obtained when the present invention is applied to modulation codes which generate patterns having D.C. components.

Further, the present invention is not limited to these embodiments, but various variations and modifications may be made without departing from the scope of the present invention.

What is claimed is:

1. An encoding unit which encodes data to be recorded on a recording medium, said encoding unit comprising:
first means for inserting resynchronizing bytes between two data blocks within a data field when converting data coded by a predetermined modulation code which generates patterns having D.C. components into pulse width modulation data, said resynchronizing bytes having resynchronizing patterns and achieving synchronization when a clock slip occurs within the data field;
second means for calculating a digital sum value for a predetermined data block, said digital sum value indicating a difference between a sum total of logic values "1" and a sum total of logic values "0" in the pulse width modulation data; and
third means for controlling said first means so that the resynchronizing bytes having resynchronizing patterns that minimize the digital sum value is inserted in a present data block.

2. The encoding unit as claimed in claim 1, wherein said second means comprises:
first counter means for counting the sum total of the logic values "1" in the pulse width modulation data;
second counter means for counting the sum total of the logic values "0" in the pulse width modulation data; and
adder means for obtaining the digital sum value in real time based on a difference between the sum totals output from said first and second counter means.

3. The encoding unit as claimed in claim 2, wherein said predetermined modulation code is a run-length limited (1, 7) modulation code, and said second means latches digital sum values up to present with a timing of a predetermined bit of the resynchronizing bytes which are converted into the run-length limited (1, 7) modulation code, where said predetermined bit is a third or subsequent bit and 5 or more bits before a last bit of said resynchronizing bytes.

4. The encoding unit as claimed in claim 3, wherein said adder means includes an adding part which adds a digital sum value immediately after being latched and a digital sum value of the resynchronizing bytes themselves.

5. The encoding unit as claimed in claim 4, wherein said adding part determines a polarity of the digital sum value of the resynchronizing bytes to be added depending on a polarity of the pulse width modulation data at the predetermined bit of the resynchronizing bytes.

6. The encoding unit as claimed in claim 2, wherein a logic value "1" is set in advance to a carry input terminal of said adder means, so that an added value is prevented from becoming "1" less due to a bit inversion input to said second counter means.

7. The encoding unit as claimed in claim 2, wherein:
said first counter means includes a first counter which counts a number of the logic values "1" in the pulse width modulation data for a case where resynchronizing bytes having a first resynchronizing pattern are inserted, and a second counter which counts the number of the logic values "1" in the pulse width modulation data for a case where resynchronizing bytes having a second resynchronizing pattern are inserted;
said second counter means includes a third counter which counts a number of the logic values "0" in the pulse width modulation data for the case where the resynchronizing bytes having the first resynchronizing pattern are inserted, and a fourth counter which counts the number of the logic values "0" in the pulse width modulation data for the case where the resynchronizing bytes having the second resynchronizing pattern are inserted; and
said adder means includes a first adding part which obtains a digital sum value from a difference between counted values output from said first and third counters, and a second adding part which obtains a digital sum value from a difference between counted values output from said second and fourth counters.

8. The encoding unit as claimed in claim 7, wherein said adder means further includes:
a third adding part which adds the digital sum value output from said first adding part and a digital sum value of the resynchronizing bytes having the first resynchronizing pattern and outputs a digital sum value with respect to the pulse width modulation data inserted with the resynchronizing bytes having the first resynchronizing pattern; and a fourth adding part which adds the digital sum value output from said second adding part and a digital sum value of the resynchronizing bytes having the second resynchronizing pattern and outputs a digital sum value with respect to the pulse width modulation data inserted with the resynchronizing bytes having the second resynchronizing pattern;

said third and fourth adding parts respectively outputting a carry bit as a judging signal which indicates whether the digital sum value has a positive or negative polarity.

9. The encoding unit as claimed in claim 8, wherein said third means comprises selecting means for selectively outputting a digital sum value having a smaller absolute value between the digital sum values output from said third and fourth adding parts based on said judging signal.

10. The encoding unit as claimed in claim 9, wherein, when the digital sum values output from said third and fourth adding parts are respectively denoted by DSV1 and DSV2 and absolute values of DSV1 and DSV2 are equal, said selecting means selects the first resynchronizing pattern when DSV1=DSV2, selects the second resynchronizing pattern when DSV1>0 and DSV2<0, and selects the first resynchronizing pattern when DSV1<0 and DSV2>0.

11. The encoding unit as claimed in claim 9, wherein said third means further comprises preloading means for preloading the digital sum value having the smaller absolute value and output from said selecting means to said first through fourth counters with a timing corresponding to a predetermined bit of the resynchronizing bytes.

12. The encoding unit as claimed in claim 11, wherein said preloading means preloads the digital sum value output from said selecting means to said first and second counters as it is when the digital sum value has a positive polarity, and preloads the digital sum value output from said selecting means to said third and fourth counters after inverting the digital sum value when the digital sum value has a negative polarity.

13. The encoding unit as claimed in claim 1, wherein said first means includes storage means for temporarily storing at least data which are 1 data block prior to the present data block.

14. A storage unit which encodes and records data on a recording medium, said storage unit comprising:

first means for inserting resynchronizing bytes between two data blocks within a data field when converting data coded by a predetermined modulation code which generates patterns having D.C. components into pulse width modulation data, said resynchronizing bytes having resynchronizing patterns and achieving synchronization when a clock slip occurs within the data field;

second means for calculating a digital sum value for a predetermined data block, said digital sum value indicating a difference between a sum total of logic values "1" and a sum total of logic values "0" in the pulse width modulation data;

third means for controlling said first means so that the resynchronizing bytes having resynchronizing patterns that minimize the digital sum value is inserted in a present data block; and recording means for recording the pulse width modulation data obtained by said first means on the recording medium.

15. The storage unit as claimed in claim 14, wherein said second means comprises:

first counter means for counting the sum total of the logic values "1" in the pulse width modulation data;

second counter means for counting the sum total of the logic values "0" in the pulse width modulation data; and adder means for obtaining the digital sum value in real time based on a difference between the sum totals output from said first and second counter means.

16. The storage unit as claimed in claim 15, wherein said predetermined modulation code is a run-length limited (1, 7) modulation code, and said second means latches digital sum values up to present with a timing of a predetermined bit of the resynchronizing bytes which are converted into the run-length limited (1, 7) modulation code, where said predetermined bit is a third or subsequent bit and 5 or more bits before a last bit of said resynchronizing bytes.

17. The storage unit as claimed in claim 16, wherein said adder means includes an adding part which adds a digital sum value immediately after being latched and a digital sum value of the resynchronizing bytes themselves.

18. The storage unit as claimed in claim 17, wherein said adding part determines a polarity of the digital sum value of the resynchronizing bytes to be added depending on a polarity of the pulse width modulation data at the predetermined bit of the resynchronizing bytes.

19. The storage unit as claimed in claim 15, wherein a logic value "1" is set in advance to a carry input terminal of said adder means, so that an added value is prevented from becoming "1" less due to a bit inversion input to said second counter means.

20. The storage unit as claimed in claim 15, wherein:

said first counter means includes a first counter which counts a number of the logic values "1" in the pulse width modulation data for a case where resynchronizing bytes having a first resynchronizing pattern are inserted, and a second counter which counts the number of the logic values "1" in the pulse width modulation data for a case where resynchronizing bytes having a second resynchronizing pattern are inserted;

said second counter means includes a third counter which counts a number of the logic values "0" in the pulse width modulation data for the case where the resynchronizing bytes having the first resynchronizing pattern are inserted, and a fourth counter which counts the number of the logic values "0" in the pulse width modulation data for the case where the resynchronizing bytes having the second resynchronizing pattern are inserted; and said adder means includes a first adding part which obtains a digital sum value from a difference between counted values output from said first and third counters, and a second adding part which obtains a digital sum value from a difference between counted values output from said second and fourth counters.

21. The storage unit as claimed in claim 20, wherein said adder means further includes:

a third adding part which adds the digital sum value output from said first adding part and a digital sum value of the resynchronizing bytes having the first resynchronizing pattern and outputs a digital sum value with respect to the pulse width modulation data inserted with the resynchronizing bytes having the first resynchronizing pattern; and a fourth adding part which adds the digital sum value output from said second adding part and a digital sum value of the resynchronizing bytes having the second resynchronizing pattern and outputs a digital sum value with respect to the pulse width modulation data inserted with the resynchronizing bytes having the second resynchronizing pattern;

said third and fourth adding parts respectively outputting a carry bit as a judging signal which indicates whether the digital sum value has a positive or negative polarity.

22. The storage unit as claimed in claim 21, wherein said third means comprises selecting means for selectively outputting a digital sum value having a smaller absolute value between the digital sum values output from said third and fourth adding parts based on said judging signal.

23. The storage unit as claimed in claim 22, wherein, when the digital sum values output from said third and fourth adding parts are respectively denoted by DSV1 and DSV2 and absolute values of DSV1 and DSV2 are equal, said selecting means selects the first resynchronizing pattern when DSV1=DSV2, selects the second resynchronizing pattern when DSV1>0 and DSV2<0, and selects the first resynchronizing pattern when DSV1<0 and DSV2>0.

24. The storage unit as claimed in claim 22, wherein said third means further comprises preloading means for preloading the digital sum value having the smaller absolute value and output from said selecting means to said first through fourth counters with a timing corresponding to a predetermined bit of the resynchronizing bytes.

25. The storage unit as claimed in claim 24, wherein said preloading means preloads the digital sum value output from said selecting means to said first and second counters as it is when the digital sum value has a positive polarity, and preloads the digital sum value output from said selecting means to said third and fourth counters after inverting the digital sum value when the digital sum value has a negative polarity.

26. The storage unit as claimed in claim 14, wherein said first means includes storage means for temporarily storing at least data which are 1 data block prior to the present data block.

\* \* \* \* \*

UNITED STATES PATENT AND TRADEMARK OFFICE
CERTIFICATE OF CORRECTION

PATENT NO. : 5,673,243
DATED : September 30, 1997
INVENTOR(S) : Yanagi et al.

It is certified that error appears in the above-identified patent and that said Letters Patent is hereby corrected as shown below:

Column 2, line 24, delete "level. margin"

and insert --level margin-- therefor.

Column 4, line 22, delete "FIG. Z." and insert --FIG.2.-- therefor.

Column 4, line 23, delete ""01 ","10"" and insert --"01", "10"-- therefor.

Column 4, line 45, delete "to 19" and insert

--0 to 19-- therefor

UNITED STATES PATENT AND TRADEMARK OFFICE
CERTIFICATE OF CORRECTION

PATENT NO. : 5,673,243
DATED : September 30, 1997
INVENTOR(S) : Yanagi et al.

It is certified that error appears in the above-identified patent and that said Letters Patent is hereby corrected as shown below:

Column 5, line 16, delete "...∥(or" and insert

--...INV1 (or INV2)∥-- therefor.

Column 5, line 57, delete "is "598"" and insert --is "596"-- therefor.

Column 5, line 65, delete "is. necessary" and insert --is necessary-- therefor.

Column 6, line 17, delete "FIG. 8" and insert

--FIG. 6--therefor.

Column 6, line 36, delete "circuit 18" and insert --circuit 15-- therefor.

UNITED STATES PATENT AND TRADEMARK OFFICE
CERTIFICATE OF CORRECTION

PATENT NO. : 5,673,243
DATED : September 30, 1997
INVENTOR(S) : Yanagi et al.

It is certified that error appears in the above-identified patent and that said Letters Patent is hereby corrected as shown below:

Column 8, line 27, delete "pulse. stream"

and insert --pulse stream-- therefor.

Signed and Sealed this

Eighth Day of September, 1998

Attest:

BRUCE LEHMAN

Attesting Officer    Commissioner of Patents and Trademarks